United States Patent
Igelnik et al.

(10) Patent No.: US 10,390,238 B1
(45) Date of Patent: Aug. 20, 2019

(54) SYSTEM, METHOD, AND COMPUTER PROGRAM FOR QUANTIFYING REAL-TIME BUSINESS AND SERVICE IMPACT OF UNDERPERFORMING, OVERLOADED, OR FAILED CELLS AND SECTORS, AND FOR IMPLEMENTING REMEDIAL ACTIONS PRIORITIZATION

(71) Applicant: Amdocs Development Limited, Limassol (CY)

(72) Inventors: Mark Igelnik, Beer Yaakov (IL); Eyal Goldzand, Elkana (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 16/175,653

(22) Filed: Oct. 30, 2018

(51) Int. Cl.
*H04W 24/00* (2009.01)
*H04W 24/02* (2009.01)
(Continued)

(52) U.S. Cl.
CPC ...... *H04W 24/02* (2013.01); *G06Q 10/06316* (2013.01); *G06Q 30/0201* (2013.01);
(Continued)

(58) Field of Classification Search
CPC ..... H04W 24/02; H04W 16/18; H04W 24/08; H04W 84/042; H04L 41/0677; G06Q 30/0201; G06Q 10/06316
(Continued)

(56) References Cited

U.S. PATENT DOCUMENTS 6,785,541 B2  8/2004  Martin
7,081,823 B2  7/2006  Gluhovsky et al.
(Continued)

FOREIGN PATENT DOCUMENTS

CN  101964985 A  2/2011
EP  2053892 A1  4/2009

OTHER PUBLICATIONS

Szilagyi et al., "An Automatic Detection and Diagnosis Framework for Mobile Communication Systems," IEEE Transactions on Network and Service Management, vol. 9, No. 2, Jun. 2012, pp. 184-197.
(Continued)

*Primary Examiner* — Amancio Gonzalez
(74) *Attorney, Agent, or Firm* — Zilka-Kotab, P.C.

(57) ABSTRACT

A system, method, and computer program product are provided for quantifying real-time business and service impact of underperforming, overloaded, or failed cells and sectors, and for implementing remedial actions prioritization. In operation, a system monitors a plurality of cells or sectors associated with one or more mobile networks. The system identifies failed, underperforming, or overloaded cells or sectors in at least one impacted area from the plurality of cells or sectors associated with the one or more mobile networks. The system continuously identifies and updates a subset of the plurality of cells or sectors in the at least one impacted area. The system continuously identifies impacted customers in the at least one impacted area. The system continuously estimates a number of impacted customers in the at least one impacted area. The system continuously identifies customers who will likely be impacted in a defined upcoming amount of hours in the at least one impacted area. The system continuously estimates a number of customers that will be impacted in the defined upcoming amount of hours per the at least one impacted area. The
(Continued)

system continuously estimates a potential business value of the at least one impacted area. Moreover, the system prioritizes remedial actions in the one or more mobile networks based on at least one of: the estimation of the number of impacted customers in the at least one impacted area; the estimation of the number of customers that will be impacted in the defined upcoming amount of hours per the at least one impacted area; and the estimation of the potential business value of the at least one impacted area.

20 Claims, 14 Drawing Sheets

(51) Int. Cl.
*G06Q 10/06* (2012.01)
*G06Q 30/02* (2012.01)
*H04W 24/08* (2009.01)
*H04W 16/18* (2009.01)
*H04L 12/24* (2006.01)
*H04W 84/04* (2009.01)

(52) U.S. Cl.
CPC ......... *H04L 41/0677* (2013.01); *H04W 16/18* (2013.01); *H04W 24/08* (2013.01); *H04W 84/042* (2013.01)

(58) Field of Classification Search
USPC ....................................................... 455/424
See application file for complete search history.

(56) References Cited

U.S. PATENT DOCUMENTS

| | | | |
|---|---|---|---|
| 7,599,308 | B2 | 10/2009 | Laver et al. |
| 8,793,363 | B2 | 7/2014 | Sater et al. |
| 8,923,134 | B2 | 12/2014 | Meredith et al. |
| 9,392,574 | B1 | 7/2016 | Glenn et al. |
| 9,426,665 | B2 * | 8/2016 | Ge .................. H04W 24/04 |
| 9,749,880 | B2 | 8/2017 | Bao et al. |
| 2006/0142001 | A1 | 6/2006 | Moisan et al. |
| 2006/0153083 | A1 | 7/2006 | Wallenius |
| 2006/0270400 | A1 * | 11/2006 | DaSilva .............. H04W 24/00 455/423 |
| 2006/0285489 | A1 | 12/2006 | Francisco et al. |
| 2007/0002759 | A1 | 1/2007 | Diaz et al. |
| 2007/0129086 | A1 | 6/2007 | Toone |
| 2009/0052330 | A1 | 2/2009 | Matsunaga et al. |
| 2009/0262650 | A1 | 10/2009 | Shaikh et al. |
| 2010/0157841 | A1 | 6/2010 | Puthenpura et al. |
| 2010/0271956 | A1 | 10/2010 | Diwakar et al. |
| 2011/0014925 | A1 | 1/2011 | Antic et al. |
| 2011/0078291 | A1 * | 3/2011 | Bickson .............. G06F 11/3409 709/221 |
| 2011/0231704 | A1 | 9/2011 | Ge et al. |
| 2012/0157089 | A1 | 6/2012 | Yang et al. |
| 2014/0022918 | A1 | 1/2014 | Guo et al. |
| 2018/0123862 | A1 | 5/2018 | Nayak et al. |

OTHER PUBLICATIONS

Ghosh et al., "Modeling and Characterization of Large-Scale Wi-Fi Traffic in Public Hot-Spots," Proceedings IEEE INFOCOM, 2011, pp. 2921-2929.

* cited by examiner

SYSTEM, METHOD, AND COMPUTER PROGRAM FOR QUANTIFYING REAL-TIME BUSINESS AND SERVICE IMPACT OF UNDERPERFORMING, OVERLOADED, OR FAILED CELLS AND SECTORS, AND FOR IMPLEMENTING REMEDIAL ACTIONS PRIORITIZATION

FIELD OF THE INVENTION

The present invention relates to a system for quantifying real-time business and service impact of underperforming, overloaded, or failed cells and sectors, and remedial actions prioritization.

BACKGROUND

Current Service Assurance systems detect network issues and anomalies. However, such systems impact on customers and businesses is limited. That complicates prioritization of follow-up actions, and impacts operational efficiency, service quality, and overall customer experience. This task is especially complex in mobile networks, where there is no permanent connection of customer devices to access network equipment (e.g. RAN, UTRAN, E-UTRAN, etc.), and cell/sector outage does not necessarily mean a customer's service is impacted because this customer may be served by a neighbor cell/hot spot with no or minimal service disruption.

Currently, the customer impact is calculated manually and is based on a simple comparison of the current traffic within the cell/sector with the expected cell/sector. This is normally performed without real visibility on the impact to the customer and business and leads to overestimation or underestimation of real customer and business impacts.

There is thus a need for addressing these and/or other issues associated with the prior art.

SUMMARY

A system, method, and computer program product are provided for quantifying real-time business and service impact of underperforming, overloaded, or failed cells and sectors, and for implementing remedial actions prioritization. In operation, a system monitors a plurality of cells or sectors associated with one or more mobile networks. The system identifies failed, underperforming, or overloaded cells or sectors in at least one impacted area from the plurality of cells or sectors associated with the one or more mobile networks. The system continuously identifies and updates a subset of the plurality of cells or sectors in the at least one impacted area. The system continuously identifies impacted customers in the at least one impacted area. The system continuously estimates a number of impacted customers in the at least one impacted area. The system continuously identifies customers who will likely be impacted in a defined upcoming amount of hours in the at least one impacted area. The system continuously estimates a number of customers that will be impacted in the defined upcoming amount of hours per the at least one impacted area. The system continuously estimates a potential business value of the at least one impacted area. Moreover, the system prioritizes remedial actions in the one or more mobile networks based on at least one of: the estimation of the number of impacted customers in the at least one impacted area; the estimation of the number of customers that will be impacted in the defined upcoming amount of hours per the at least one impacted area; and the estimation of the potential business value of the at least one impacted area.

DETAILED DESCRIPTION

Figure 1:
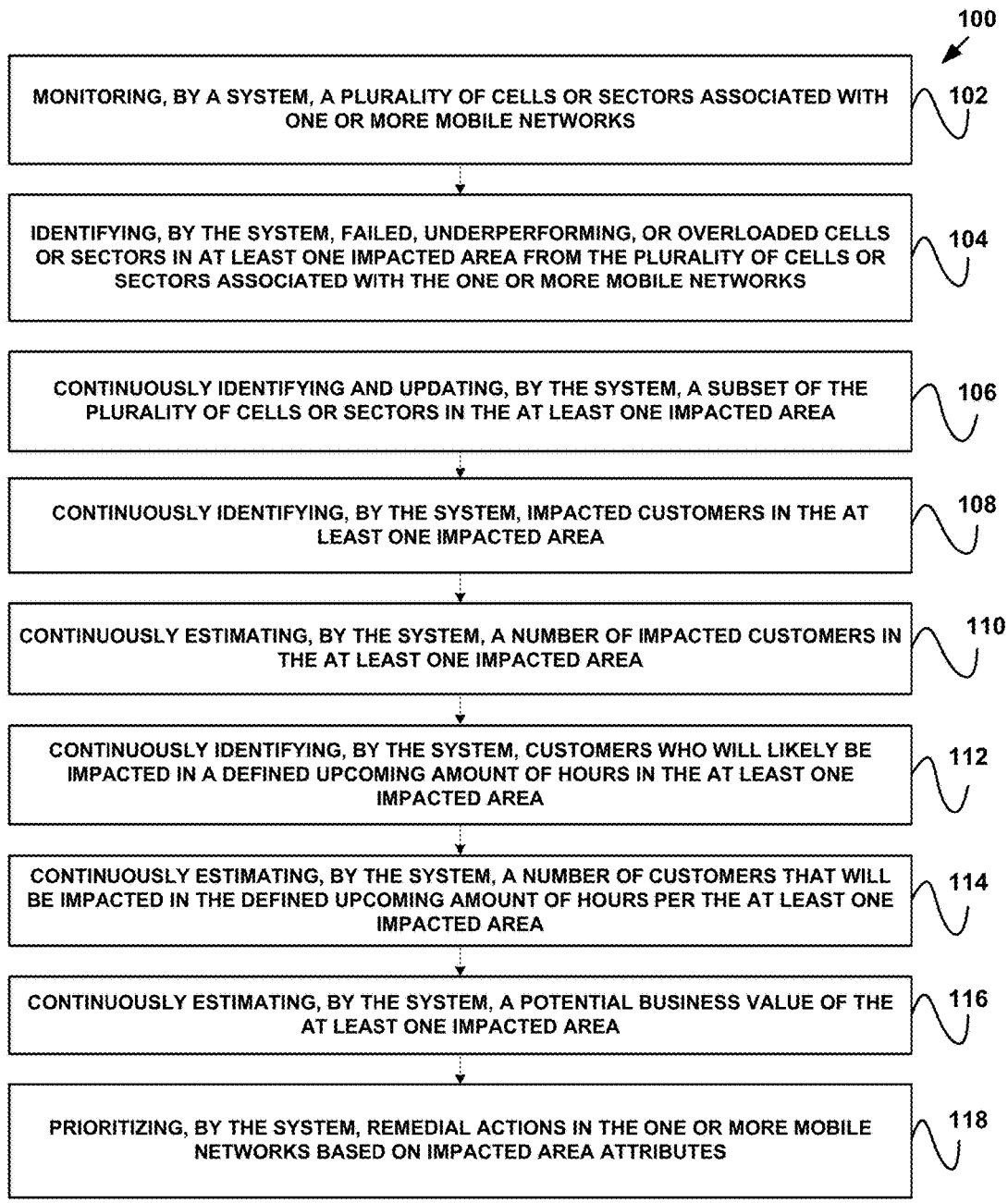
FIG. 1 illustrates a method for quantifying real-time business and service impact of underperforming, overloaded, or failed cells and sectors, and for implementing remedial actions prioritization, in accordance with one embodiment.

FIG. 1 illustrates a method 100 for quantifying real-time business and service impact of underperforming, overloaded, or failed cells and sectors, and for implementing remedial actions prioritization, in accordance with one embodiment.

In operation, a system monitors a plurality of cells or sectors associated with one or more mobile networks. See operation 102. The mobile networks may be associated with any type of cellular network (e.g. LTE, etc.).

The system identifies failed, underperforming, or overloaded cells or sectors in at least one impacted area from the plurality of cells or sectors associated with the one or more mobile networks. See operation 104. In one embodiment, identifying failed, underperforming, or overloaded cells or sectors in the impacted area may include utilizing key performance indicators (KPIs) associated with the plurality of cells or sectors associated with the one or more mobile networks. In this case, the KPIs may be associated with one or more of accessibility, retainability, integrity, mobility, and throughput, etc.

The system continuously identifies and updates a subset of the plurality of cells or sectors in the at least one impacted area. See operation 106. The system continuously identifies impacted customers in the at least one impacted area. See operation 108. In one embodiment, identifying the impacted customers may include extracting data from data records, logs, or traces, etc.

The system continuously estimates a number of impacted customers in the at least one impacted area. See operation 110. In one embodiment, the number of impacted customers may be estimated by quantifying performance counters for every phase of mobile service establishment, service consumption, and/or service release, etc.

The system continuously identifies customers who will likely be impacted in a defined upcoming amount of hours in the at least one impacted area. See operation 112. In one embodiment, the customers who will likely be impacted in the defined upcoming amount of hours may be identified as customers who will likely be serviced by the plurality of cells or sectors in the at least one impacted area for the defined upcoming amount of hours.

The system continuously estimates a number of customers that will be impacted in the defined upcoming amount of hours per the at least one impacted area. See operation 114. The system continuously estimates a potential business value of the at least one impacted area. See operation 116.

Moreover, the system prioritizes remedial actions in the one or more mobile networks based on impacted area attributes. See operation 118. The service impacting problem attributes can be the estimation of the number of impacted customers in the at least one impacted area; the estimation of the number of customers that will be impacted in the defined upcoming amount of hours per the at least one impacted area; and the estimation of the potential business value of the at least one impacted area, the presence of VIP cell in the impacted area or any other quantified and/or qualified service and/or business impacts of the impacted area. The prioritized remedial actions may be presented utilizing one or more user interfaces, etc.

In one embodiment, the method 100 may further comprise: obtaining, by the system, configuration and topology data for the plurality of cells or sectors associated with the one or more mobile networks; obtaining, by the system, fault and performance data for the plurality of cells or sectors associated with the one or more mobile networks; obtaining, by the system, data records, logs, and call traces for the customers associated with the at least one impacted area; and obtaining, by the system, customer subscription characteristics and associated business values for the customers associated with the at least one impacted area.

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
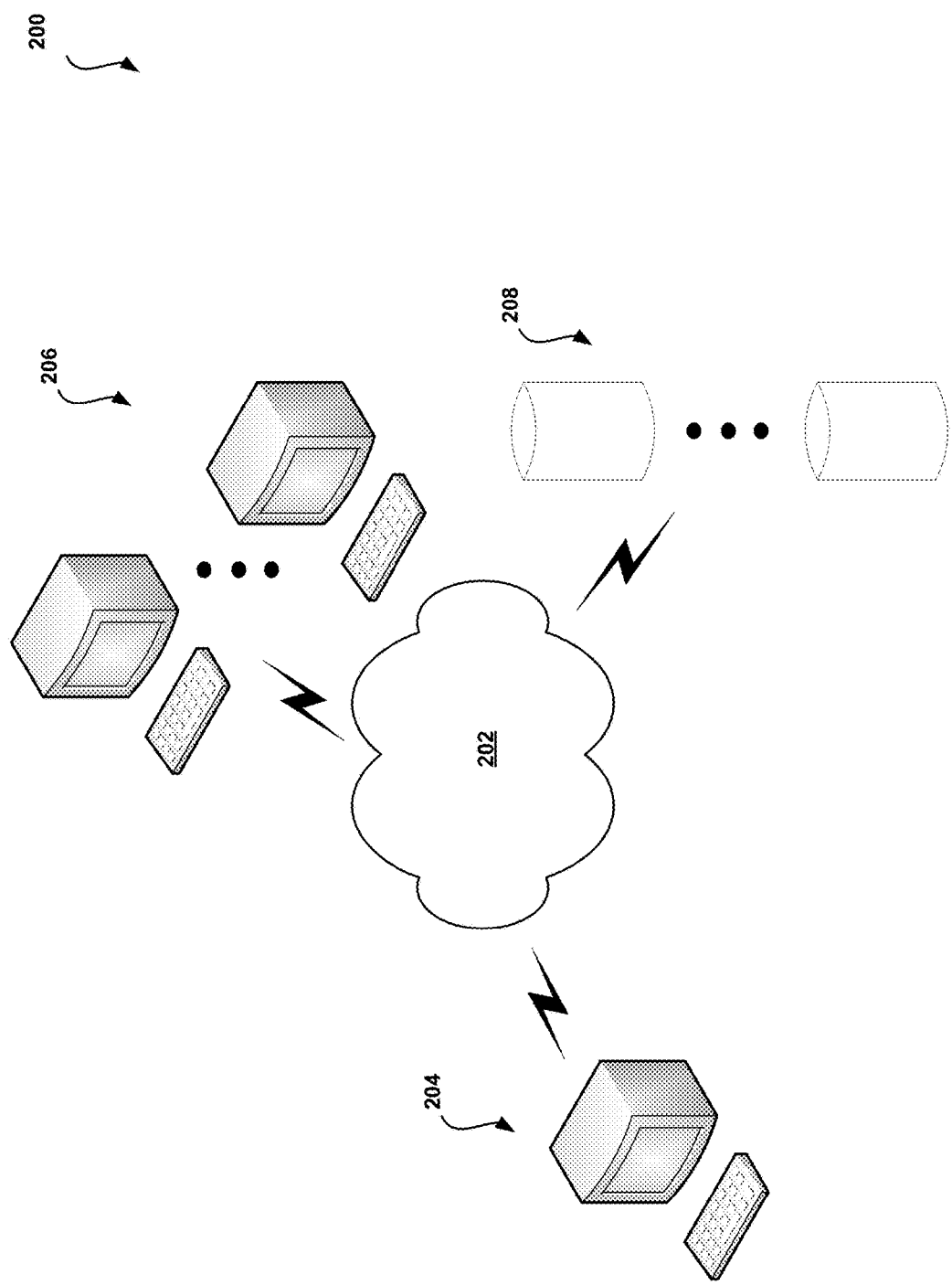
FIG. 2 shows a system for quantifying real-time business and service impact of underperforming, overloaded, or failed cells and sectors, and for implementing remedial actions prioritization, in accordance with one embodiment.
Figure 3A:
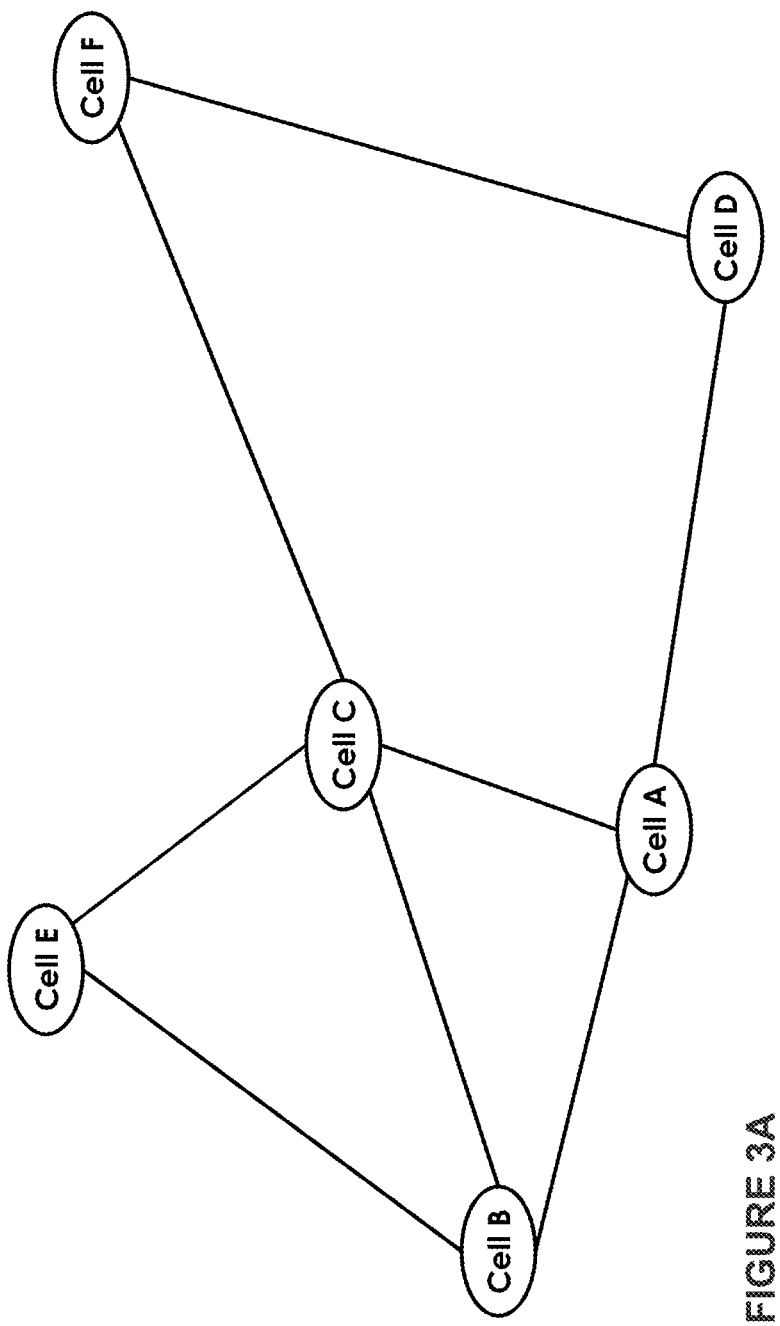
FIGS. 3A-3I show examples illustrating the building of impacted areas by a system, in accordance with one embodiment.
Figure 3B:
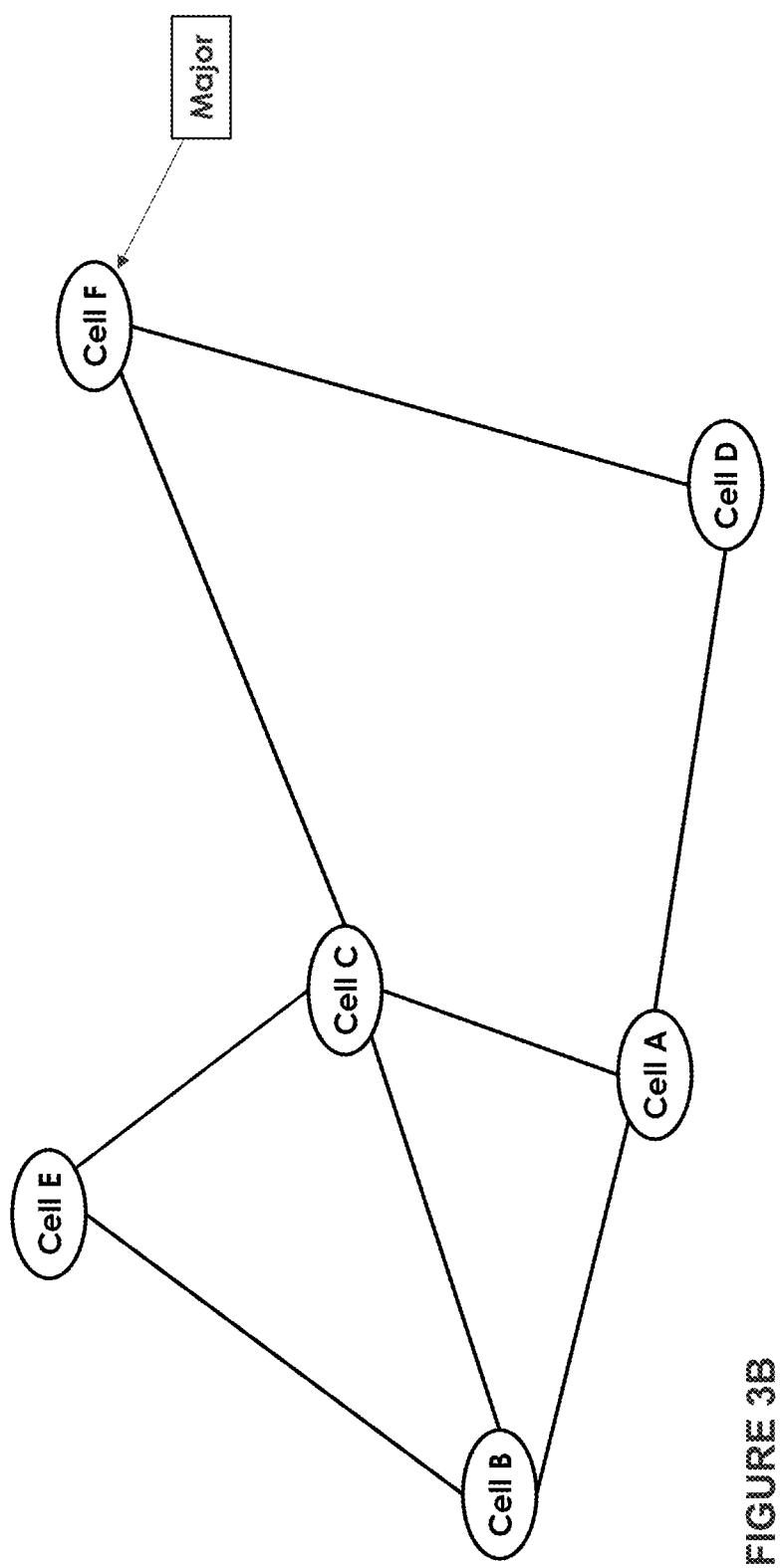
Figure 3C:
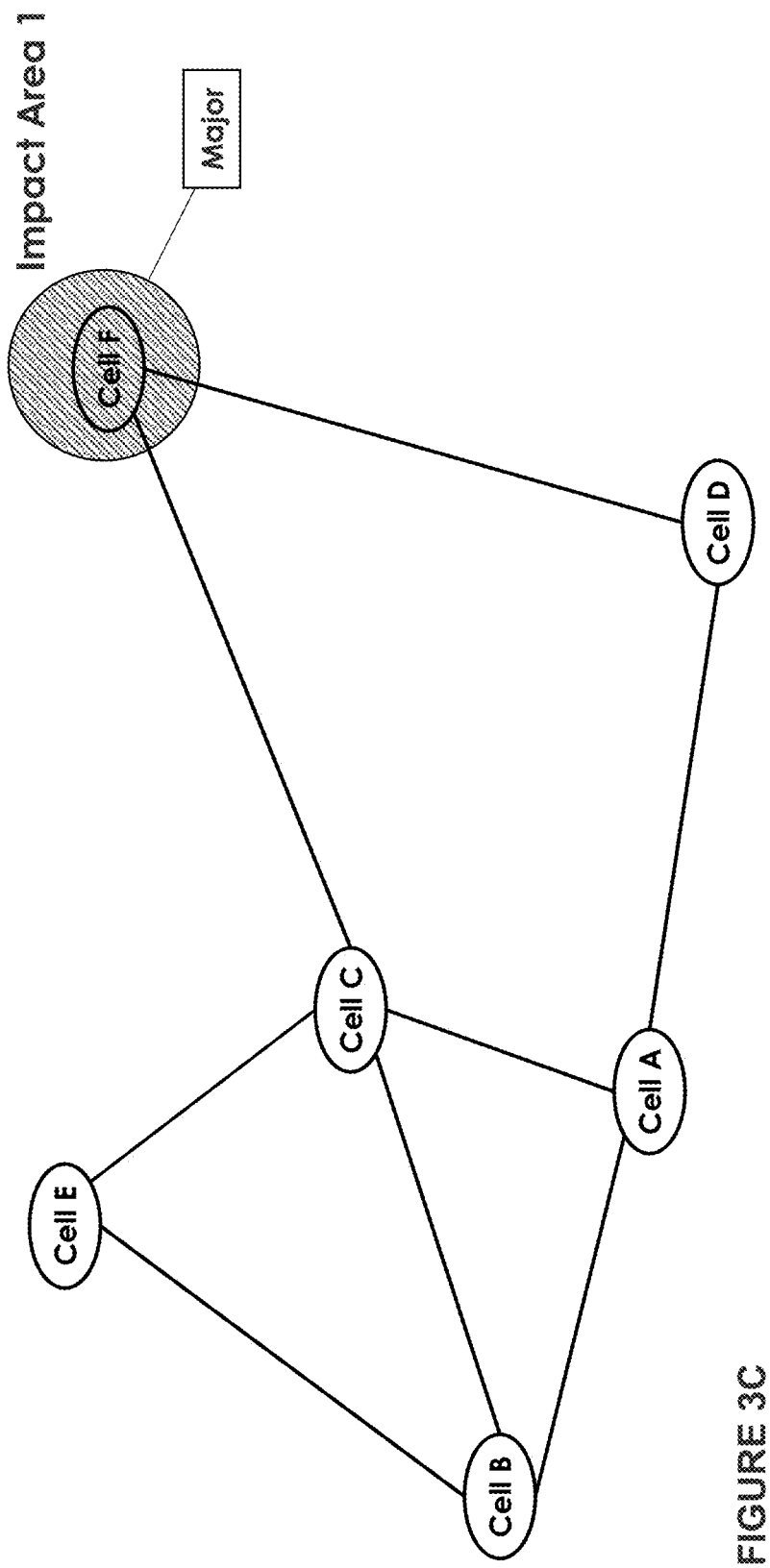
Figure 3D:
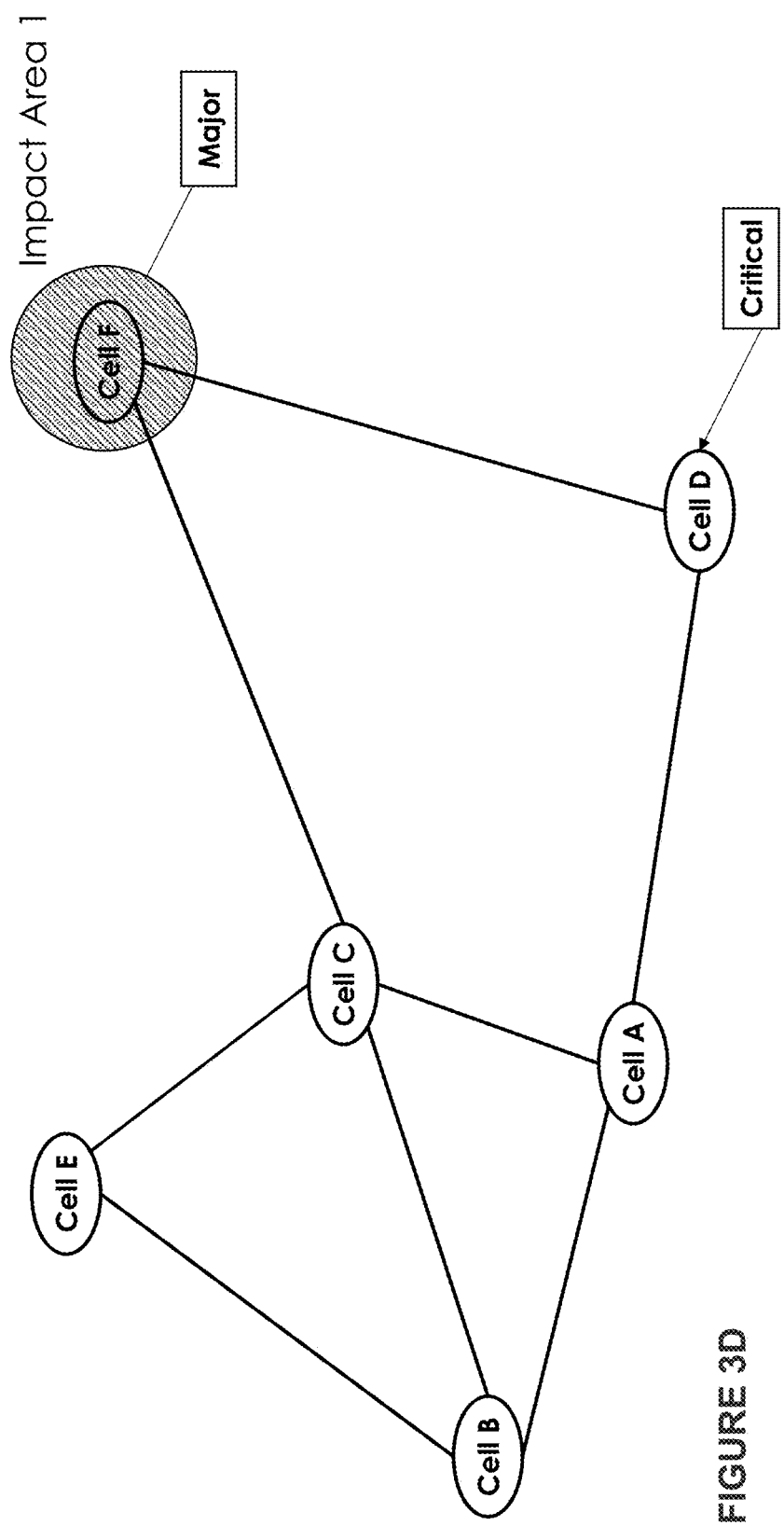
Figure 3E:
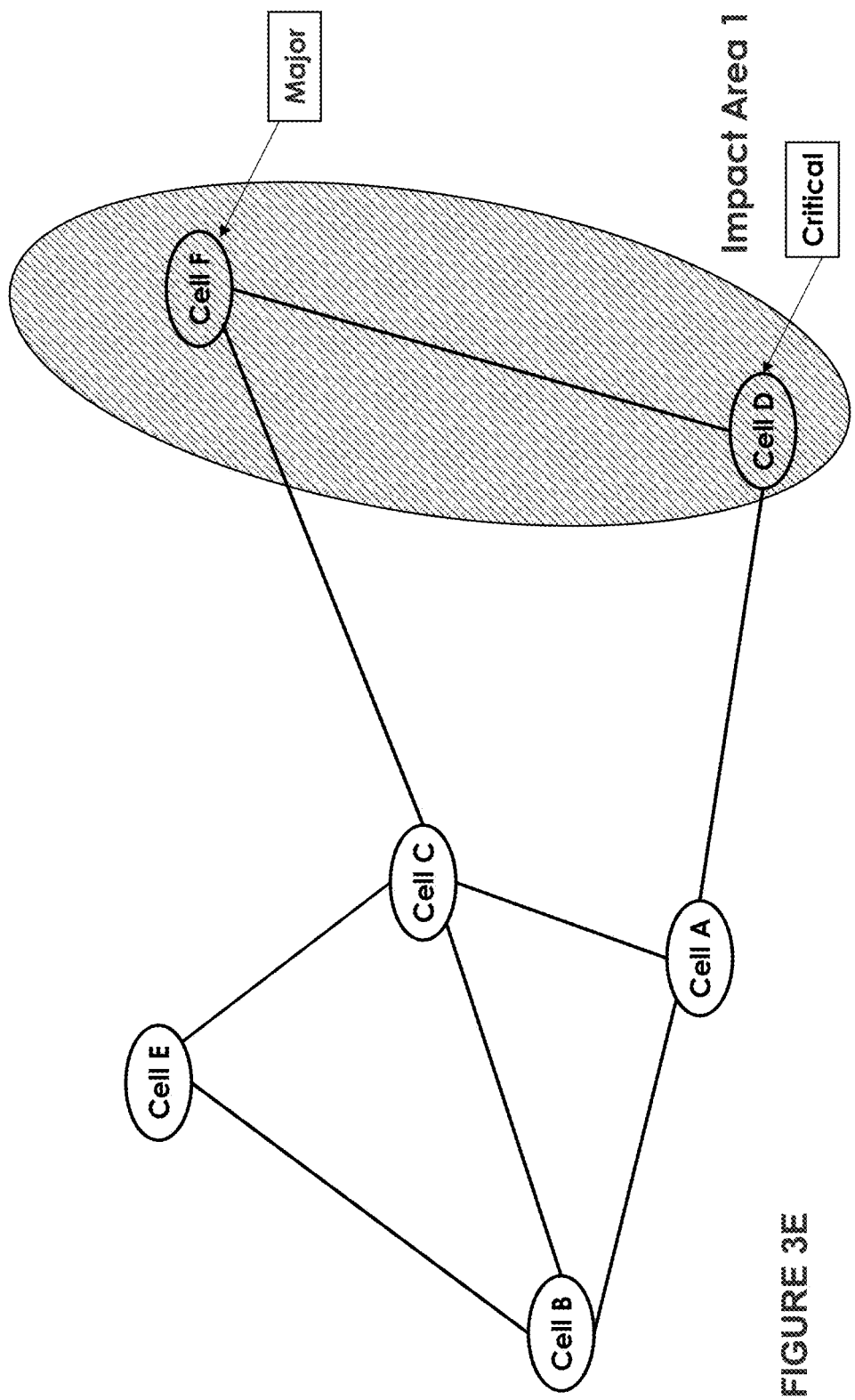
Figure 3F:
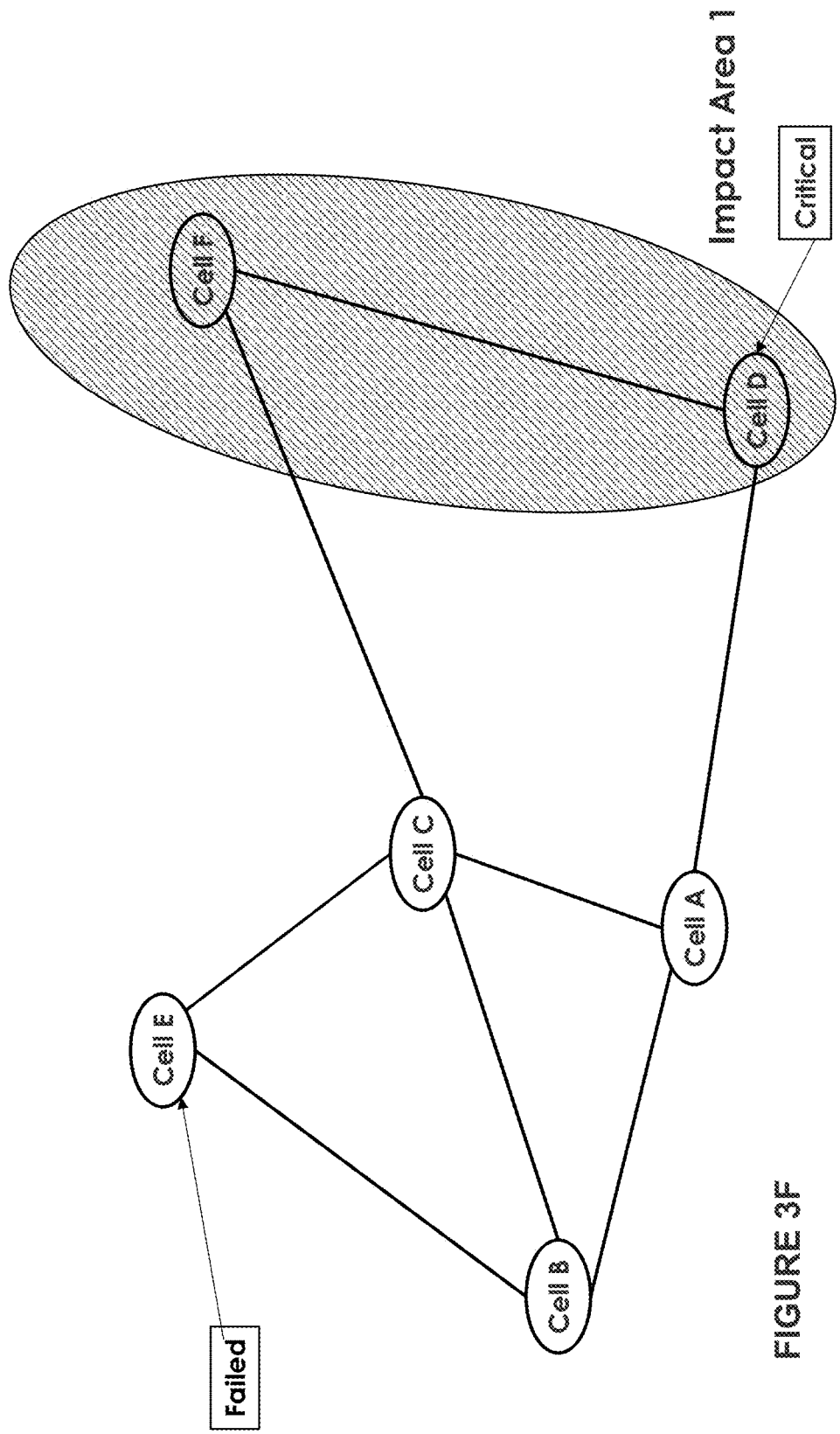
Figure 3G:
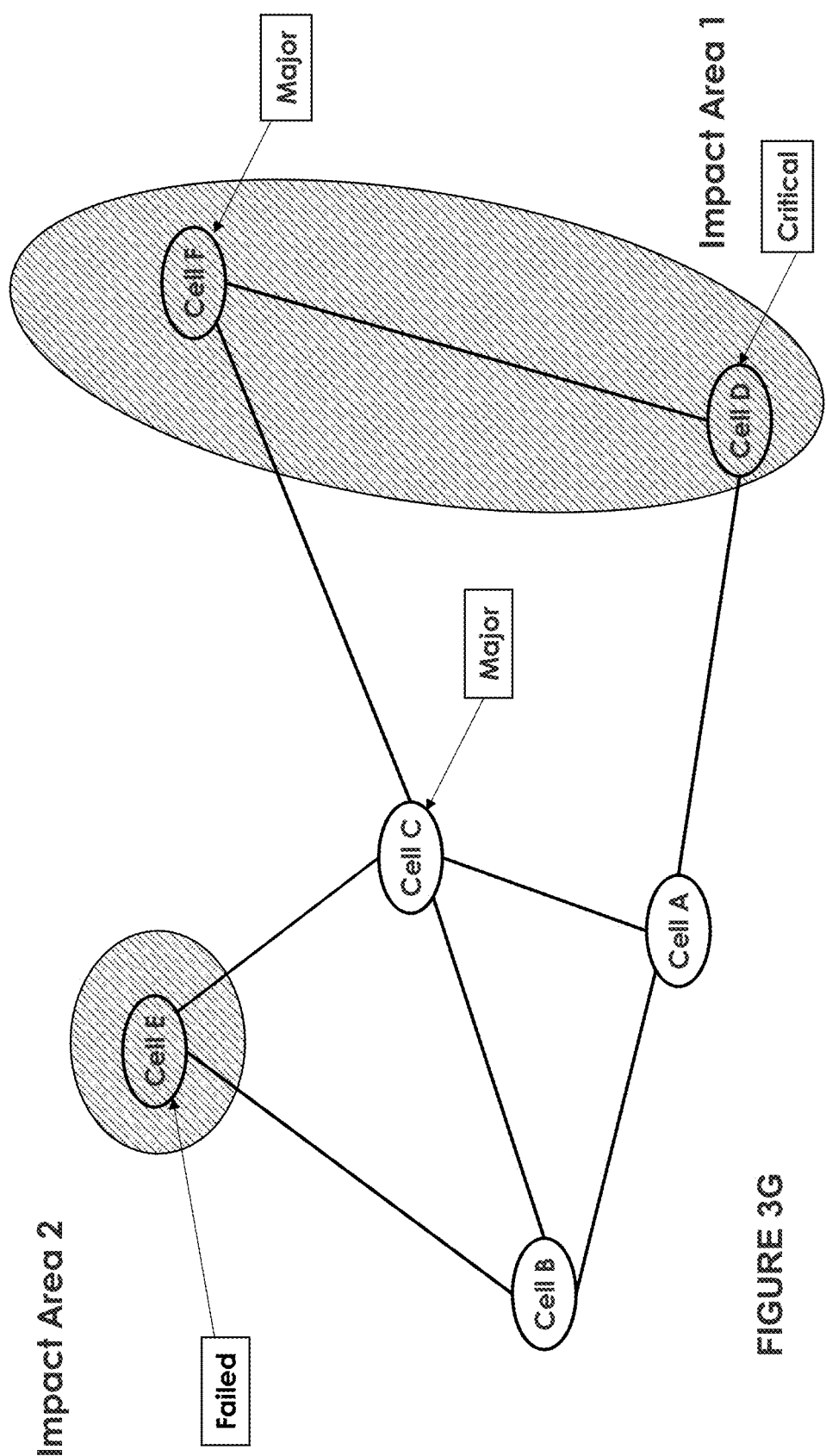
Figure 3H:
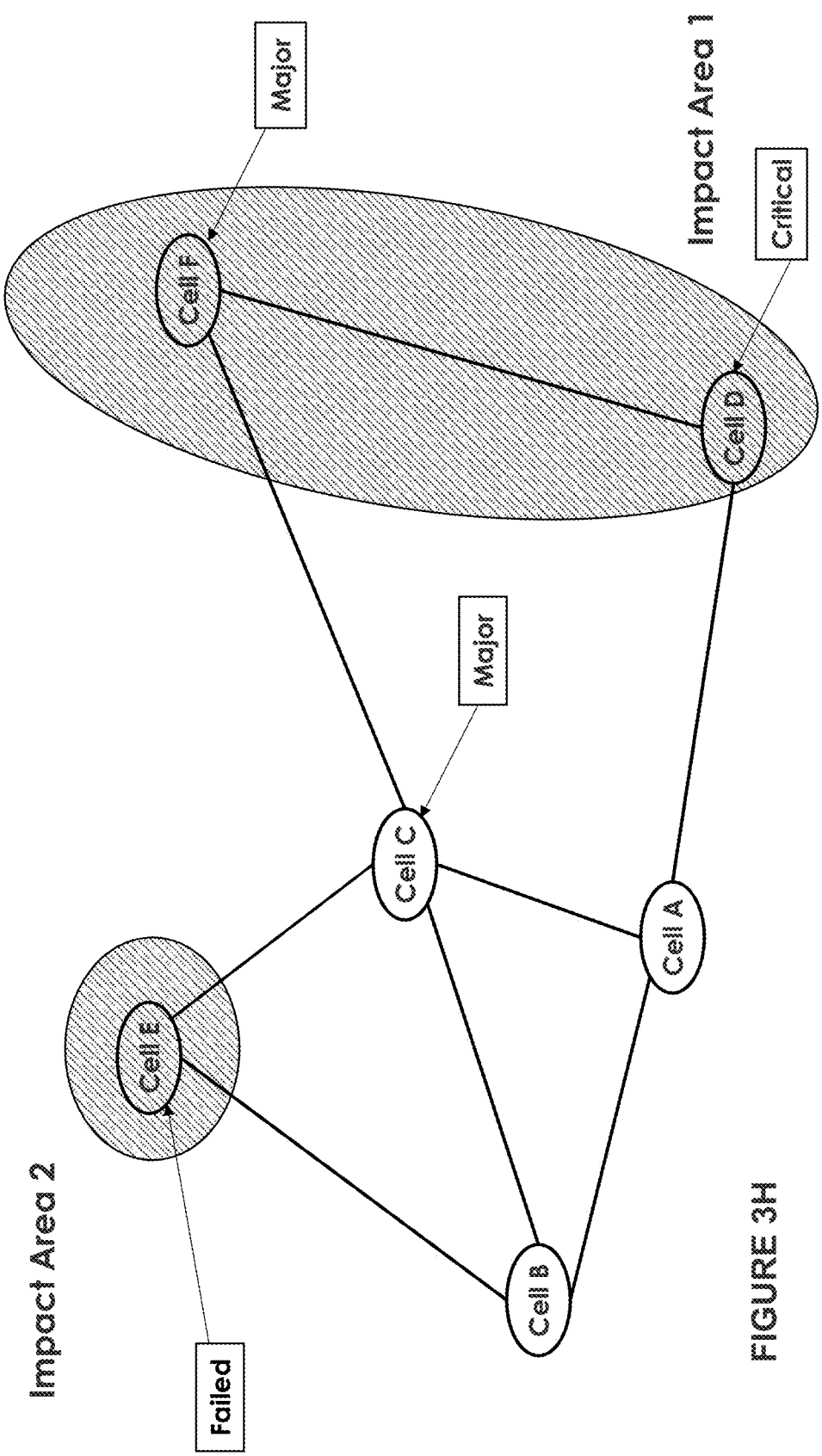
Figure 3I:
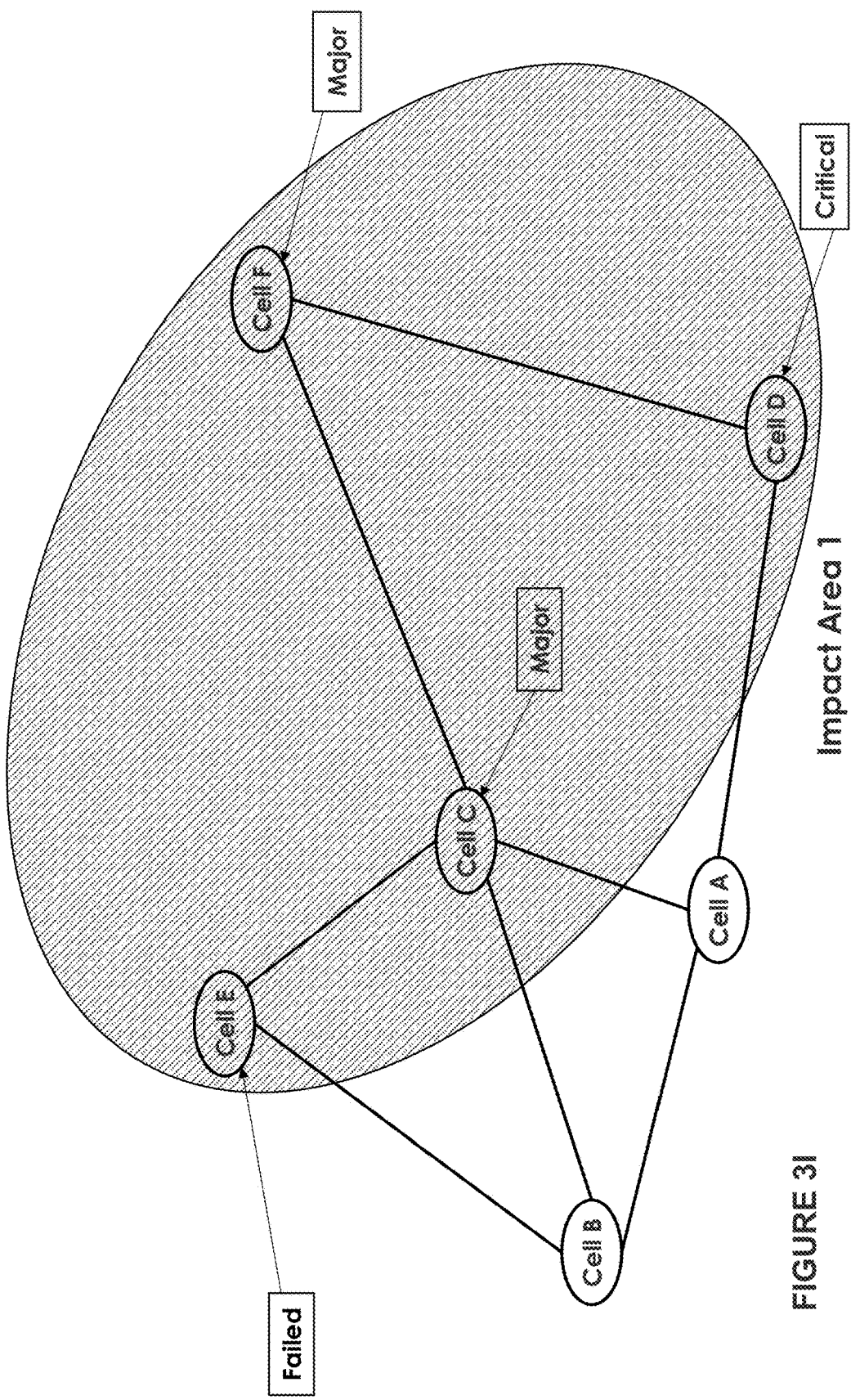

FIG. 2 shows a system 200 for quantifying real-time business and service impact of underperforming, overloaded, or failed cells and sectors, and remedial actions prioritization, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a system 204, which may implement a variety of applications or software, etc. The system 204 may be capable of communicating with a plurality of systems 206, either directly or over one or more networks 202, for quantifying real-time business and service impact of underperforming, overloaded, or failed cells and sectors, and for performing remedial actions prioritization. The system 204 may also be in communication with one or more repositories/databases 208.

In operation, the system 204 may be utilized for real time definition of impacted areas in mobile networks due to underperforming, overloaded, or failed cells/sectors, estimation of impacted customers within the area, estimation a total number of customers that would be potentially impacted in the coming hours within the impacted area, estimation of business value of the impacted customers and potentially impacted customers, and prioritization of remedial actions based on estimated value. For example, the system 204 may monitor, in real time, an entire cellular network of a Communication Service Provider (CSP), detect underperforming, overloaded, and failed cells or sectors, map impacted areas as a continuum of neighboring underperforming/overloaded cells/sectors, estimate a total number of impacted customers and potentially impacted customers in the coming hours per each impacted area, calculate their business value (e.g. Average Revenue Per User—ARPU, etc.), and prioritize remedial actions within an operational area based on business value and/or cell/sector priority.

The system 204 may continuously identify impacted customers in an impacted area, continuously estimate the number of impacted customers in the impacted area, and continuously identify customers who most likely might be impacted in the upcoming hours in the impacted area. Further, the system 204 may continuously estimate the number of customers that would be impacted in the upcoming hours per impacted area, and continuously estimate the potential business value of the impacted area.

Moreover, the system 204 may prioritize remedial actions in the cellular network based on the estimation of the number of impacted customers in the impacted area or estimation of the number of customers that would be impacted in the upcoming hours per impacted area, or the estimation of potential business value of the impacted area (or any combination of impacted area characteristics).

In one embodiment, the system 204 may obtain (e.g. receive, retrieve, etc.) all CSP cells/sectors configuration and topology data from an available source. The system 204 may also obtain all CSP cells/sectors fault and performance data from an available source. Additionally, the system may obtain data records/logs/call traces or any other similar mobile services data records means where the service behavior is recorded together with a subscriber device (e.g. a mobile station, etc.) and subscription identities. Further, the system may obtain CSP customers subscription characteristics (e.g. customer segment, customer profile, etc.) and their business value (e.g. ARPU, scores, Live Time Value, etc.) from an available source. The source may include, for example, Business Support Systems (BSS), etc.

In one embodiment, the system 204 may identify failed, underperforming, or overloaded cells/sectors as cells/sectors with at least one of a predefined network KPI characteristic, such as where a minor or higher (e.g. severe) alarm is received.

Further, in one embodiment, the system may identify the impacted areas for a complete mobile network by: checking cells/sectors for each impacted cell/sector from a Neighboring Cell List (NCL); creating a new impacted area associated with a detected impacted cell/sector (i.e. a Root Cause Cell) if there are no neighbor cells/sectors already associated with the existing impacted area; associating the impacted cell/sector with the existing impacted area if there is only one impacted area associated with the neighbor cells/sectors; merging impacted areas and associating the impacted cell/sector with the merged impacted area if there are more than one impacted area associated with neighbor cells/sectors; and changing the Root Cause Cell of the impacted area to the cell/sector with current most severe problem. The network KPIs used for the identification may include one or more of accessibility, retainability, integrity, mobility, throughput, or any other relevant KPI per cell/sector technology, as well as actual to expected traffic ratios per each service category/service/device manufacturer or specific device.

The system 204 may obtain the expected traffic by: creating, based on historical data, mobility patterns for each cell/sector and each service category/service/device manufacturer or specific device; and continuously updating cells/sectors mobility pattern with a new data. The mobility pattern may include: expected traffic for each service category/service/device manufacturer or specific device type per each hour of a day per workday, weekend, and holiday by removing a seasonal trend and special events; and subscriber device and subscription identities (e.g. IMSI, MSISDN, IMEI, etc.) of the customers that are most likely consuming mobile services within a cell/sector per each hour per each hour of a day per workday, weekend, and holiday by removing a seasonal trend and special events (e.g. Cell Subscriber List); business characteristics of the customers (e.g. customer segment, associated business account if relevant, ARPU, scores, Live Time Value, etc.) from a Cell Subscriber List; and expected average business value (e.g. ARPU, scores, Life Time Value, etc.) per each hour of a day per workday, weekend, and holiday by removing a seasonal trend and special events.

The system 204 may extract the identification of impacted customers in the impacted area from the available data records/logs/traces or any other recording means where the service impacting abnormal behavior was recorded together with the impacted subscriber device and subscription identities (e.g. IMSI, MSISDN, IMEI, etc.).

Furthermore, the system 204 may estimate the number of impacted customers in the impacted area by quantifying performance counters for every phase of mobile service establishment, service consumption or service release. In one embodiment, this technique may be used as a complementary method when available recording means cannot provide subscriber device and subscription identities for every phase of mobile service establishment, service consumption, or service release.

The customers who most likely might be impacted in the upcoming hours (e.g. a predetermined time, etc.) in the impacted area may be identified, by the system 204, as customers who most likely will be covered by cells/sectors comprising the impacted area for the upcoming hours. The number of customers that would be impacted in the upcoming hours per impacted area may be estimated, by the system 204, with the same ratio of impacted customers to total customers as it was counted or estimated in last monitored period.

The potential business value (e.g. the cumulative ARPU of impacted customers, etc.) in the impacted area may be calculated, by the system 204, as the sum of business value of the impacted customers identified via available recording means and complementary average expected business value for an estimated number of customers quantified based on mobile service establishment phases performance counters.

In one embodiment, prioritizing remedial action in the mobile network may be based on impacted are attributes such as the estimation of the number of impacted customers in the impacted area, an estimation of the number of customers that would be impacted in the upcoming hours per impacted area, or an estimation of potential business value of the impacted area, or the presence of VIP cell in the impacted area or any other quantified and/or qualified service and/or business impacts of the impacted area (or any combination of impacted area attributes).

In another embodiment, the system 204 may implement a method for definition of business impact in the impacted area comprising collecting data from available sources (e.g. from BSS, etc.), based on a subscription identity, the subscription characteristics (e.g. customer segment, customer profile, etc.) and the business value of an impacted customer (e.g. ARPU, scores, Live Time Value etc.). In this case, the estimation of the number of impacted customers in the impacted area may be used as a complementary technique when available recording means cannot provide mobile device and subscription identities for every phase of mobile service establishment, service consumption or service release. This may include collecting and obtaining any available cellular communication service data records or attempt to establish mobile communication service data records, logs, traces, or any other recording means generated by network elements, element managers, probes, smart agents, etc.; identifying the phase of mobile service establishment, service consumption, or service release where the service impacting abnormal behavior was recorded in data records/logs/traces or any other recording means; identifying subscriber device and subscription identities (e.g. IMSI, MSISDN, IMEI, etc.) where available, from the data records/logs/traces or any other recording means where the service impacting abnormal behavior was recorded together with impacted subscriber device and subscription identities; and approximating (upper bound) a number of impacted customers in the impacted area due to a specific problem defined by a specific cell/sector performance counter for mobile service establishment, service consumption, or service release specific phases where available recording means cannot provide subscriber device and subscription identities.

Customers who most likely might be impacted in the upcoming hours in the impacted area may be customers identified by the system in a Cell Subscriber List for cells/sectors comprising the impacted area for these hours. The estimation of the number of customers that may be impacted in the upcoming hours per impacted area may be extrapolated, by the system 204, based on changes in the Cell Subscribers List with the same ratio of impacted customers to total customers as it was counted or estimated in the last measured period. The estimation of potential business value (e.g. a cumulative ARPU of impacted customers, etc.) of the impacted area may be calculated, by the system 204, and a business value of the impacted customers may be identified via available recording means. The system 204 may approximate the rest of a business impact based on the cellular service establishment phases performance counters.

Still yet, the system 204 may implement a method for prioritization of remedial action in a mobile network based on the estimation of the number of impacted customers in the impacted area, an estimation of the number of customers that would be impacted in the upcoming hours per impacted area, or an estimation of potential business value of the impacted area (or any combination of impacted area characteristics).

FIGS. 3A-3I show examples illustrating the building of impacted areas by a system, in accordance with one embodiment. As an option, the examples may be viewed in the context of the details of the previous figures and/or any subsequent figure(s). Of course, however, the examples may be viewed in the context of any desired environment. Further, the aforementioned definitions may equally apply to the description below.

As shown in the examples depicted in FIGS. 3A-3I, the system implementing the techniques described herein may identify a plurality of impacted areas as varying levels of severity, such as major, critical, and failed. The areas may include cells or sectors.

In another embodiment, the system 204 may be utilized to implement a business rules driven, real-time service problem resolution activities automation, by: providing real-time service problem resolution activities automation; monitoring a plurality of service impacting problems and their characteristics; continuously checking service impacting problem attributes against predefined business rules; continuously checking impacted customer's business characteristics against predefined business rules; triggering work flows defined by the business rule when the business rule matches impacting problem attributes; creating, editing, and deleting business rules and associated work flows; activating, deactivating, and scheduling business rules and associated work flows; and updating a problem and subscriber attributes library.

Current Service Assurance systems detect network and IT issues and anomalies. However, in such systems there is a demand for clear demarcation between all low-level events and real customer impacting outages, while maintaining the ability to handle both outages and events automatically by triggering self-healing (e.g. SON) for further problem resolution, notifying impacted customers and/or customer account representatives, alerting/notifying different stakeholders within organizations and groups for human intervention only when necessary.

Figure 4:
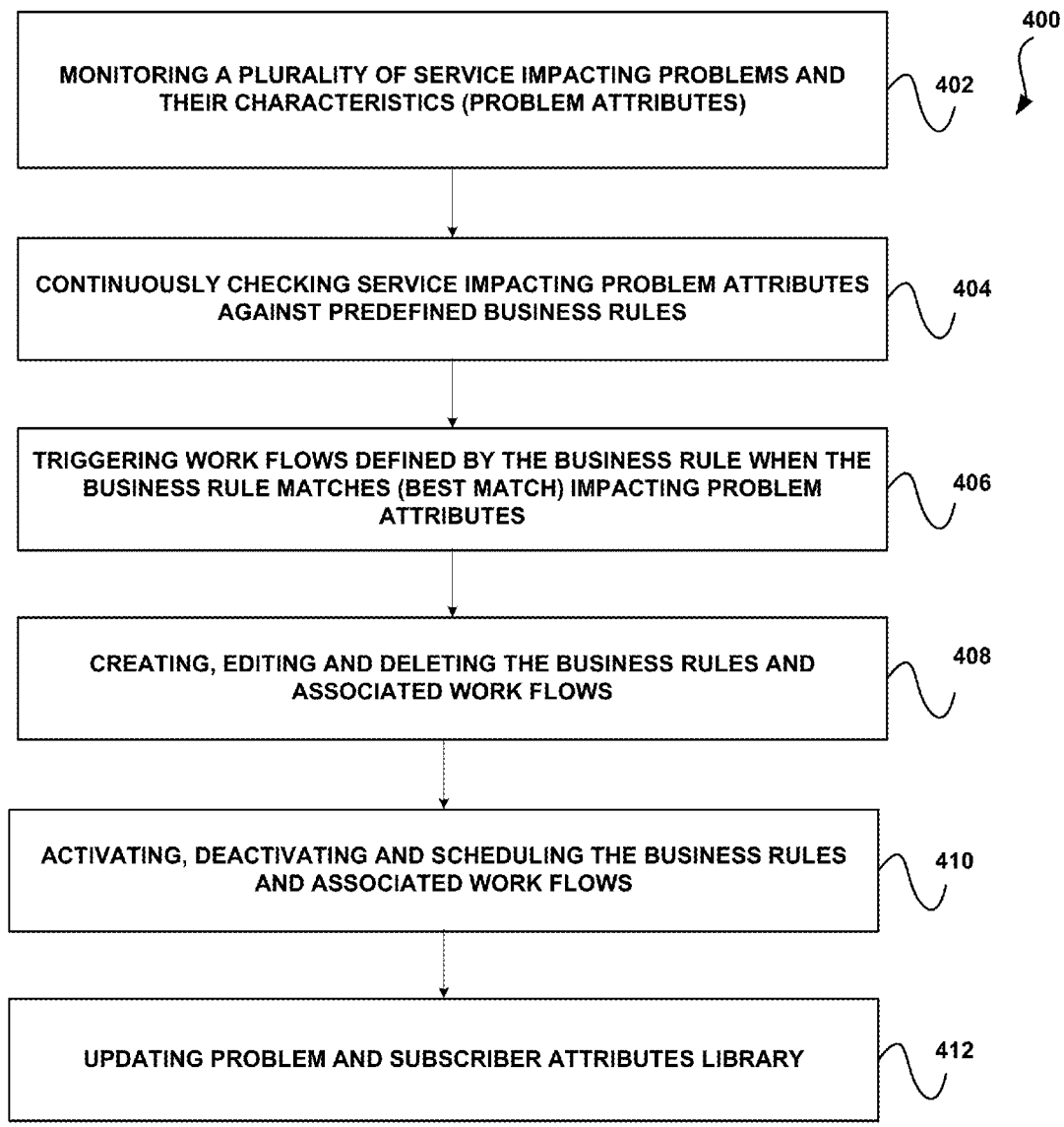
FIG. 4 shows a flow diagram for business rules driven, real-time service problem resolution activities automation, in accordance with one embodiment.

FIG. 4 shows a flow diagram 400 for business rules driven, real-time service problem resolution activities automation, in accordance with one embodiment. As an option, the flow diagram 400 may be implemented in the context of the details of the previous figures and/or any subsequent figure(s). Of course, however, the flow diagram 400 may be implemented in the context of any desired environment. Further, the aforementioned definitions may equally apply to the description below.

In operation, a system implements a method of real-time service problem resolution activities automation comprising: monitoring a plurality of service impacting problems and their characteristics (e.g. problem attributes, see operation 402); continuously checking service impacting problem attributes against predefined business rules (see operation 404); triggering work flows defined by the business rule when the business rule matches (best match) impacting problem attributes (see operation 406); creating, editing and deleting the business rules and associated work flows (see operation 408); activating, deactivating and scheduling the business rules and associated work flows (see operation 410); and updating a problem and subscriber attributes library (see operation 412). It should be noted that, in one embodiment, operations 408, 410, and 412 may be viewed as (and implemented as) independent functionalities to support operations 402,404, and 406.

In one embodiment, the system may obtain an observation from available sources (e.g. from BSS) of impacted or potentially impacted customer attributes. The service can be any communication service or any service provided by a CSP related to a customer life cycle, such as service activation, modification, deactivation, termination, charging, billing, and collection, etc. The service impacting problem can be any problem affecting any service or services provided by a CSP for any group of its customers. The service impacting problem attributes can be quantified and/or qualified service and/or business impacts, a list of impacted customers by subscription identifications such as IMSI, MSISDN, directory numbers and the like, impacted area location and range, and/or expected time to repair and the like. The service impacting problem and problem attributes may be identified by underlying service assurance systems.

The business rules may define workflows for an entire problem life cycle, such as a new service impacting problem, periodic updates while problem persists, changes in problem attributes of the existing problem including the situation when an existing problem does not persist anymore. The business rules may be built of business attributes, matching expressions (e.g. true, false, equal to value, non-equal to value, greater or equal than value, less than value, etc.), attribute values used in matching expressions, logical operators that define the relationship between attributes, etc.

The work flows can include any actions such as but not limited to self-healing (e.g. SON), triggering for further problem resolution, impacted customers and/or customer account representatives' notifications, alerting/notifying different stakeholders within a CSP, opening/update/correlation/closing of trouble tickets, cases, and CRM information, and further updates on the service impacting problem development.

The customer attributes can be any customer attribute available in a Customer Representative Management (CRM) system such as customer segment, customer profile, preferred notification channel, etc., and their business value (e.g. ARPU, scores, Live Time Value, etc.).

The service and/or business impact can be a number of impacted customers in a last monitoring interval, accumulated ARPU at risk in the last monitoring interval, service degradation, potential lost revenue while a problem persists, exposure to media, reputational impact, impacted priority cell, or any other business parameter that a CSP might use for a business rules definition. The work flow actions can depend on impacted or potentially impacted customer attributes.

Figure 5:
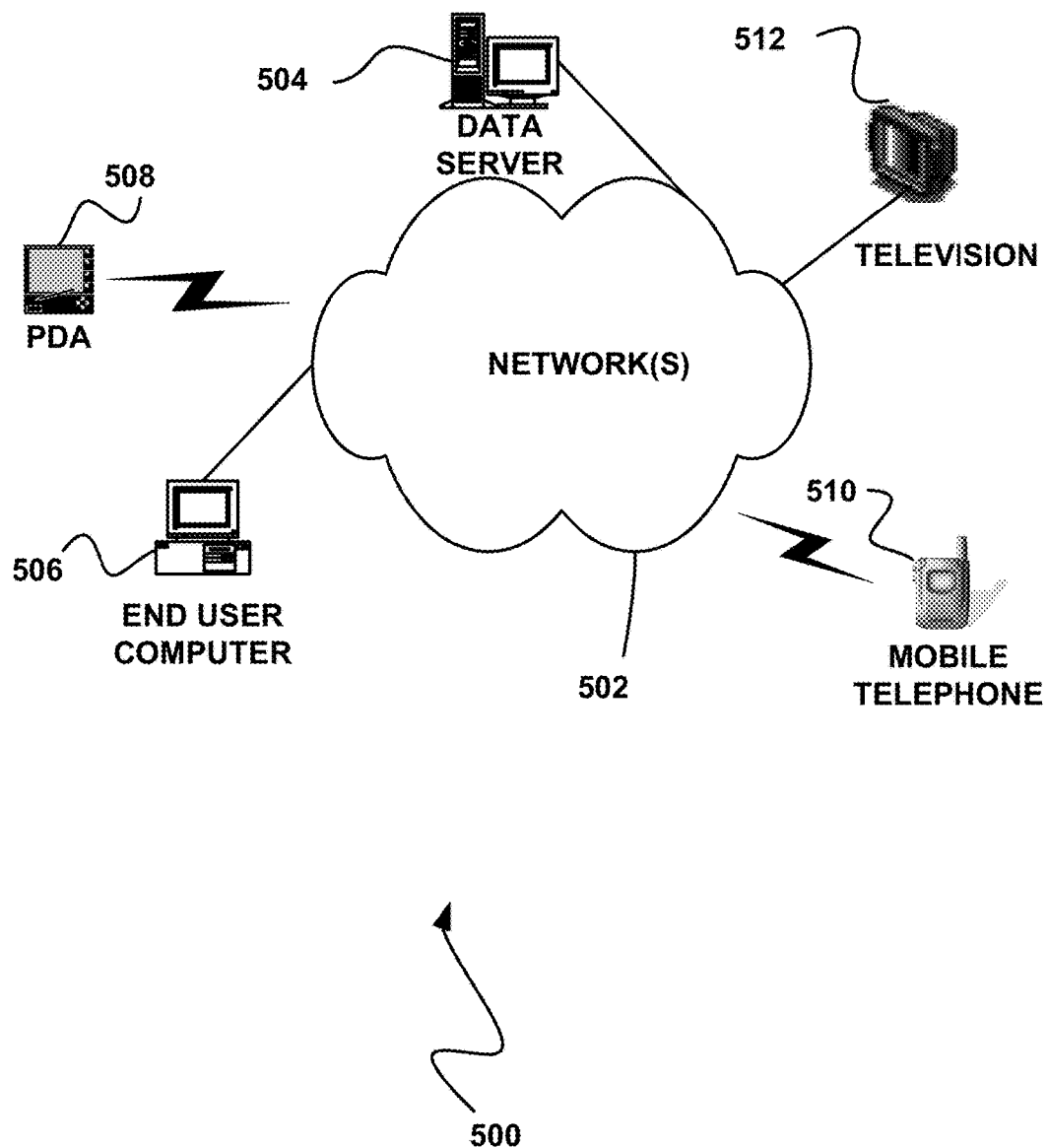
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
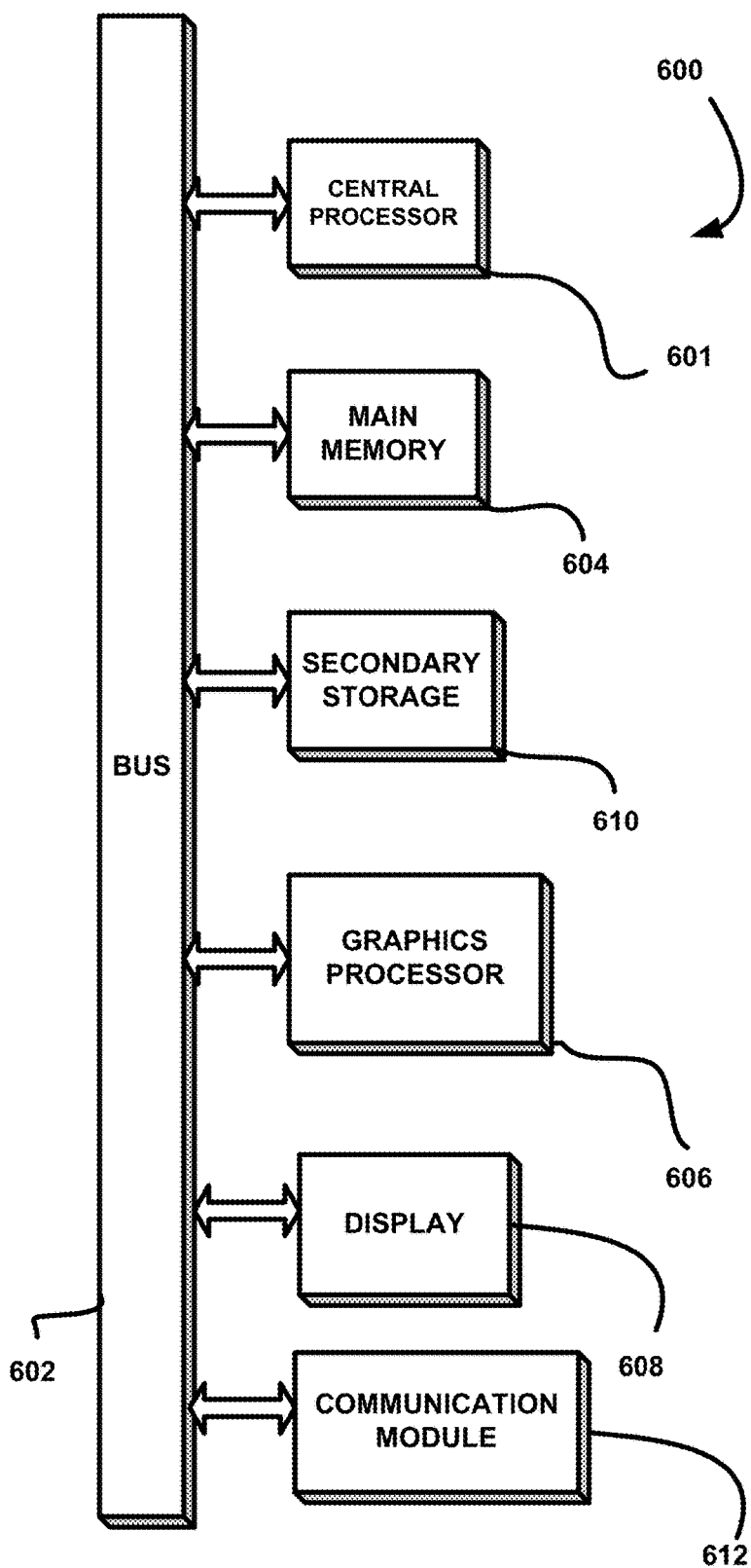
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   monitoring, by a system, a plurality of cells or sectors associated with one or more mobile networks;
   identifying, by the system, failed, underperforming, or overloaded cells or sectors in at least one impacted area from the plurality of cells or sectors associated with the one or more mobile networks;
   continuously identifying and updating, by the system, a subset of the plurality of cells or sectors in the at least one impacted area;
   continuously identifying, by the system, impacted customers in the at least one impacted area;
   continuously estimating, by the system, a number of impacted customers in the at least one impacted area;
   continuously identifying, by the system, customers who will likely be impacted in a defined upcoming amount of hours in the at least one impacted area;
   continuously estimating, by the system, a number of customers that will be impacted in the defined upcoming amount of hours per the at least one impacted area;
   continuously estimating, by the system, a potential business value of the at least one impacted area; and
   prioritizing, by the system, remedial actions in the one or more mobile networks based on at least one of: the estimation of the number of impacted customers in the at least one impacted area; the estimation of the number of customers that will be impacted in the defined upcoming amount of hours per the at least one impacted area; and the estimation of the potential business value of the at least one impacted area.

2. The method of claim 1, further comprising:
   obtaining, by the system, configuration and topology data for the plurality of cells or sectors associated with the one or more mobile networks;
   obtaining, by the system, fault and performance data for the plurality of cells or sectors associated with the one or more mobile networks;
   obtaining, by the system, data records, logs, and call traces for the customers associated with the at least one impacted area; and
   obtaining, by the system, customer subscription characteristics and associated business values for the customers associated with the at least one impacted area.

3. The method of claim 1, wherein identifying failed, underperforming, or overloaded cells or sectors in the at least one impacted area includes utilizing key performance indicators (KPIs) associated with the plurality of cells or sectors associated with the one or more mobile networks.

4. The method of claim 3, wherein the KPIs are associated with one or more of accessibility, retainability, integrity, mobility, and throughput.

5. The method of claim 1, wherein identifying the impacted customers includes extracting data from data records, logs, or traces.

6. The method of claim 1, wherein the number of impacted customers is estimated by quantifying performance counters for every phase of mobile service establishment, service consumption, or service release.

7. The method of claim 1, wherein the customers who will likely be impacted in the defined upcoming amount of hours are identified as customers who will likely be serviced by the plurality of cells or sectors in the at least one impacted area for the defined upcoming amount of hours.

8. A computer program product embodied on a non-transitory computer readable medium, comprising computer code for:
   monitoring, by a system, a plurality of cells or sectors associated with one or more mobile networks;
   identifying, by the system, failed, underperforming, or overloaded cells or sectors in at least one impacted area from the plurality of cells or sectors associated with the one or more mobile networks;
   continuously identifying and updating, by the system, a subset of the plurality of cells or sectors in the at least one impacted area;
   continuously identifying, by the system, impacted customers in the at least one impacted area;
   continuously estimating, by the system, a number of impacted customers in the at least one impacted area;
   continuously identifying, by the system, customers who will likely be impacted in a defined upcoming amount of hours in the at least one impacted area;
   continuously estimating, by the system, a number of customers that will be impacted in the defined upcoming amount of hours per the at least one impacted area;
   continuously estimating, by the system, a potential business value of the at least one impacted area; and
   prioritizing, by the system, remedial actions in the one or more mobile networks based on at least one of: the estimation of the number of impacted customers in the at least one impacted area; the estimation of the number of customers that will be impacted in the defined upcoming amount of hours per the at least one impacted area; and the estimation of the potential business value of the at least one impacted area.

9. The computer program product of claim 8, further comprising computer code for:
   obtaining, by the system, configuration and topology data for the plurality of cells or sectors associated with the one or more mobile networks;
   obtaining, by the system, fault and performance data for the plurality of cells or sectors associated with the one or more mobile networks;
   obtaining, by the system, data records, logs, and call traces for the customers associated with the at least one impacted area; and
   obtaining, by the system, customer subscription characteristics and associated business values for the customers associated with the at least one impacted area.

10. The computer program product of claim 8, wherein identifying failed, underperforming, or overloaded cells or sectors in the at least one impacted area includes utilizing key performance indicators (KPIs) associated with the plurality of cells or sectors associated with the one or more mobile networks.

11. The computer program product of claim 10, wherein the KPIs are associated with one or more of accessibility, retainability, integrity, mobility, and throughput.

12. The computer program product of claim 8, wherein identifying the impacted customers includes extracting data from data records, logs, or traces.

13. The computer program product of claim 8, wherein the number of impacted customers is estimated by quantifying performance counters for every phase of mobile service establishment, service consumption, or service release.

14. The computer program product of claim 8, wherein the customers who will likely be impacted in the defined upcoming amount of hours are identified as customers who will likely be serviced by the plurality of cells or sectors in the at least one impacted area for the defined upcoming amount of hours.

15. A system, comprising one or more processors, operable for:
- monitoring, by the system, a plurality of cells or sectors associated with one or more mobile networks;
- identifying, by the system, failed, underperforming, or overloaded cells or sectors in at least one impacted area from the plurality of cells or sectors associated with the one or more mobile networks;
- continuously identifying and updating, by the system, a subset of the plurality of cells or sectors in the at least one impacted area;
- continuously identifying, by the system, impacted customers in the at least one impacted area;
- continuously estimating, by the system, a number of impacted customers in the at least one impacted area;
- continuously identifying, by the system, customers who will likely be impacted in a defined upcoming amount of hours in the at least one impacted area;
- continuously estimating, by the system, a number of customers that will be impacted in the defined upcoming amount of hours per the at least one impacted area;
- continuously estimating, by the system, a potential business value of the at least one impacted area; and
- prioritizing, by the system, remedial actions in the one or more mobile networks based on at least one of: the estimation of the number of impacted customers in the at least one impacted area; the estimation of the number of customers that will be impacted in the defined upcoming amount of hours per the at least one impacted area; and the estimation of the potential business value of the at least one impacted area.

16. The system of claim 15, wherein the system is further operable for:
- obtaining, by the system, configuration and topology data for the plurality of cells or sectors associated with the one or more mobile networks;
- obtaining, by the system, fault and performance data for the plurality of cells or sectors associated with the one or more mobile networks;
- obtaining, by the system, data records, logs, and call traces for the customers associated with the at least one impacted area; and
- obtaining, by the system, customer subscription characteristics and associated business values for the customers associated with the at least one impacted area.

17. The system of claim 15, wherein identifying failed, underperforming, or overloaded cells or sectors in the at least one impacted area includes utilizing key performance indicators (KPIs) associated with the plurality of cells or sectors associated with the one or more mobile networks.

18. The system of claim 17, wherein the KPIs are associated with one or more of accessibility, retainability, integrity, mobility, and throughput.

19. The system of claim 15, wherein identifying the impacted customers includes extracting data from data records, logs, or traces.

20. The system of claim 15, wherein the number of impacted customers is estimated by quantifying performance counters for every phase of mobile service establishment, service consumption, or service release.

* * * * *